United States Patent [19]
Harries

[11] Patent Number: 5,992,590
[45] Date of Patent: Nov. 30, 1999

[54] HYDRAULIC ACTUATION SYSTEM

[75] Inventor: David Anthony Harries, Welford on Avon, United Kingdom

[73] Assignee: Kongsberg Techmatic Limited, Warwickshire, United Kingdom

[21] Appl. No.: 08/973,258

[22] PCT Filed: Apr. 17, 1997

[86] PCT No.: PCT/GB97/01055

§ 371 Date: Dec. 8, 1997

§ 102(e) Date: Dec. 8, 1997

[87] PCT Pub. No.: WO97/40300

PCT Pub. Date: Oct. 30, 1997

[30] Foreign Application Priority Data

Apr. 20, 1996 [GB] United Kingdom ............... 9608256

[51] Int. Cl.[6] .............................................. B60K 41/22
[52] U.S. Cl. ..................................... 192/3.58; 192/3.63
[58] Field of Search ........................... 192/3.58, 3.57, 192/3.62, 3.63

[56] References Cited

U.S. PATENT DOCUMENTS

| 3,818,776 | 6/1974 | Prenzel et al. ........................... 74/364 |
| 3,834,499 | 9/1974 | Candellero et al. ............... 192/3.58 X |
| 3,946,760 | 3/1976 | Murakami et al. ............. 192/109 F X |
| 3,979,153 | 9/1976 | Ingram et al. ..................... 188/345 X |
| 4,194,608 | 3/1980 | Usui et al. ........................... 192/3.58 X |
| 4,589,532 | 5/1986 | Ito et al. ........................... 192/1.57 X |
| 5,795,263 | 8/1998 | Harries ................................... 477/113 |
| 5,836,207 | 11/1998 | Spooner et al. ........................... 74/335 |

FOREIGN PATENT DOCUMENTS

| 915538 | 11/1946 | France ................................. 192/3.57 |
| WO 95/26472 | 10/1998 | WIPO . |

Primary Examiner—Charles A Marmor
Assistant Examiner—Ha Ho
Attorney, Agent, or Firm—Darby & Darby

[57] ABSTRACT

An actuation system particularly for the operation of a vehicle clutch and/or gearbox ratio selector members in which a pump charges an accumulator via a non-return valve. A slave cylinder receives pressurised fluid from the accumulator via a solenoid-operated control valve. The control valve also controls the exhaust of fluid from the slave cylinder. The control valve has a rest position in which pressurised fluid from the pump is returned to sump and the slave cylinder is vented to sump, a first energised position in which the return of pressured fluid to sump is cut-off and the slave cylinder remains vented to sump, and a further energised position in which venting of the slave cylinder is cut-off and the slave cylinder is supplied with pressurised fluid from the accumulator. The pump may be electrically driven and stopped when the accumulator pressure is above a pre-determined level.

11 Claims, 4 Drawing Sheets

HYDRAULIC ACTUATION SYSTEM

This invention relates to fluid-pressure operated actuation systems and in particular, though not exclusively, to such actuating systems used to operate vehicle clutches or vehicle gear selection actuators in manual, semi-automatic and automatic transmissions.

In such actuation systems the clutch or gear selection actuators are controlled by an electronic unit in response to vehicle operating parameters and vehicle driver inputs such as the operation of the vehicle throttle and gear selector lever.

There is a requirement to provide a simple, efficient and cost effective actuation system for the operation of a vehicle clutch or gear selection actuator of the form described above.

It is an object of the present invention to provide the approved form of actuation system which is particularly suitable for the above applications.

Thus according to the present invention there is provided an actuation system comprising a pump which charges an accumulator via a non-return valve, a solenoid-operated control valve which receives pressurised fluid from the accumulator, and a slave cylinder which receives pressurised fluid from the accumulator via the control valve and from which fluid can also be exhausted via the control valve, the control valve has a rest position in which pressurised fluid from the pump is returned to sump (and the slave cylinder is vented to sump), a first energised position in which the return of pressurised fluid to sump is cut-off (and the slave cylinder remains vented to sump), and a further energised position in which venting of the slave cylinder is cut-off and the slave cylinder is supplied with pressurised fluid from the accumulator.

Preferably the pump is electrically driven and is stopped when the accumulator pressure is above a pre-determined level.

Such a system has several advantages:

1. When charging of the accumulator is completed the circuit on the pump side of the non-return valve is vented to sump thus reducing any tendency for that part of the circuit to leak under high pressure.
2. When the pump starts-up its output will be initially directed back to sump, thus it will not have to try to start against high back pressure in the system. This is particularly significant in lots temperature environments where fluid viscosity is high and pumping losses can therefore be high also. This enables a smaller power output electric motor to be used to drive the pump.

The present invention will now be described, by way of example only, with reference to the accompanying drawings in which.

Figure 1:
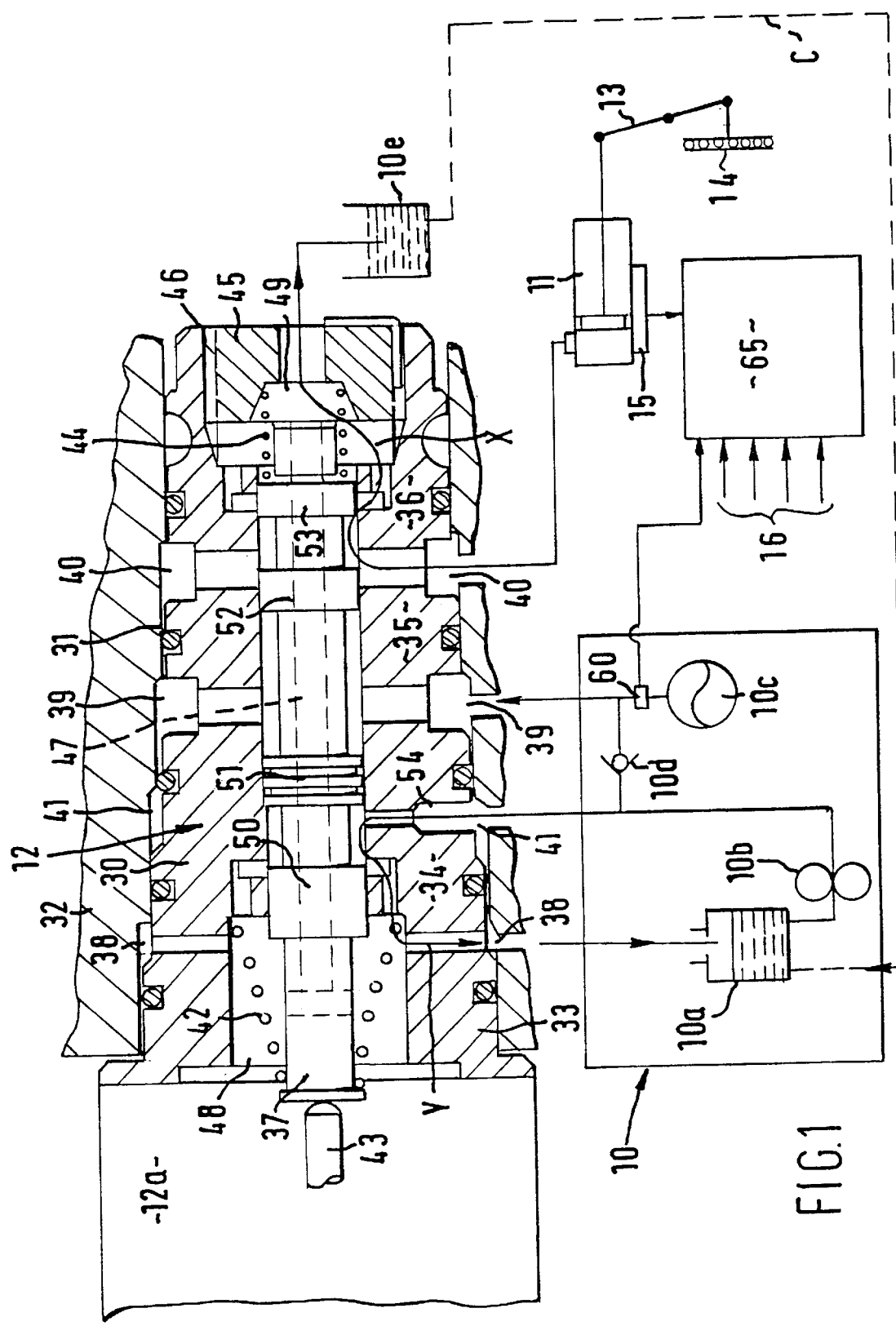
FIG. 1 shows diagrammatically clutch actuation system in accordance with the present invention.

Referring to FIG. 1 this shows a clutch actuation system which includes a hydraulic power pack 10 which operates a clutch operating slave cylinder 11 via solenoid operated fluid flow control valve 12. The power pack 10 includes a reservoir 10a, an electrically driven pump 10b, an accumulator 10c and a non-return valve 10d. The slave cylinder 11 acts on a clutch actuating lever 13 which in turn acts on a clutch release bearing 14.

The displacement of clutch operating lever 13 is measured by a sensor 15, whose output is fed to an electronic control unit 65. Control unit 65 receives other vehicle operating parameter inputs designated 16 in FIG. 1 and issues commands to solenoid 12a of the valve 12 to connect slave cylinder 11 to accumulator 10c or reservoir 10a. Full constructional and operational details of a suitable electronic control unit 65 etc. can be found in European patents Nos. 0038113, 0043660, 0059035 and 0101220 and will not therefore be given here.

Returning now to the details of solenoid valve 12, this has an outer portion 30 which is inserted into a bore 31 in a housing 32 and is held stationary therein. The outer portion 30 includes lands 33,34,35 and 36 which are in sealing contact with bore 31 to define annular passages 38, 39 and 40 which are connected with reservoir 10a, accumulator 10c and slave cylinder 11 respectively. A further passageway 41 is also defined around land 34 and is connected with pump 10b.

Within outer solenoid portion 30 is disposed an axially-movable landed spool 37 which is acted on at one end by spring 42 and solenoid spindle 43 and at the other end by a spring 44 which reacts against a threaded nut 45 whose axial position within a threaded bore 46 of outer portion 30 enables the spring loading on spool 37 to be varied as described in UK Patent Application No. 93 0839.7.

Spool 37 is provided with lands 50,51,52 and 53. With the spool 37 in the de-energised or rest position of FIG. 1 slave cylinder 11 is vented via its connection with passageway 40 which is connected with reservoir 10e via venting flow path X through an axial groove (not shown) in land 53. Also communication between accumulator 10c and slave unit 11 is cut-off by land 52. Further, pump 10b is able to pump fluid from passageway 41 through passage 54 and around land 50 as indicated by flow path Y into chamber 38 and hence back into reservoir 10a. Thus with the solenoid 12a de-energised and the spool in the FIG. 1 position the output of pump 10b is dumped back into reservoir 10a via flow path Y and any pressure in the feed to accumulator 10c on the pump side of non-return valve 10d is also dumped to reservoir 10a so that this connection is not under high pressure.

Reservoir 10e may be eliminated and venting flow path X routed to reservoir 10a via an additional passageway 47 (shown in dotted detail) down the centre of spool 37 which connects chambers 48 and 49 at the ends of the spool.

Alternatively, reservoir 10e could be eliminated and flows path X could be routed to reservoir 10a via external connection C shown in dotted detail in FIG. 1.

As soon as the electronic control unit 65 determines that action is required to charge accumulator 10c (which is detected by a pressure level sensor 60) a command is first issued by unit 65 to start electrically driven pump 10b and solenoid 12a is then energised to axially displace its spool 37 to a first position (slightly to the right of the FIG. 1 position) thus causing land 50 to cut-off the pump dumping flow Y. When in this first position the venting flow path X is still open and the output of pump 10b is now available to charge accumulator 10c via non-return valve 10d.

If control unit 65 determines that action is required to operate slave cylinder 11 a command is issued to solenoid 12a to axially displace spool 37 (and hence land 52) further to the right to close off venting flow path X with land 52 and to connect passageways 39 and 40 around land 52.

As indicated previously, all movements of slave cylinder 11 are communicated to control unit 65 by sensor 15 so that the control loop is completed and accurate control of the position of clutch release lever 13 can be obtained.

When the level of pressure in accumulator 10c is above a predetermined minimum (sensed by sensor 60 which is in communication with control unit 65) the electrically driven pump 10b can be stopped and the solenoid spool 37 returned to the FIG. 1 position when no pressurisation of slave 11 is currently required.

As will be appreciated, when the pump is restarted to recharge accumulator 10c solenoid spool 37 is initially in the FIG. 1 rest position so that the pump output dumping circuit Y is established and the pump can therefore restart against a relatively low hydraulic load. The spool then subsequently moves to its first position, described above, to enable the accumulator to be re-charged. This is particularly important in low temperature operating conditions when the viscosity of the oil being pumped may be considerable and impose a high starting load on the pump.

Also, the unloading of accumulator feed pressure on the pump side of non-return valve 10d when the accumulator is fully charged makes this system less susceptible to hydraulic leaks.

Figure 2:
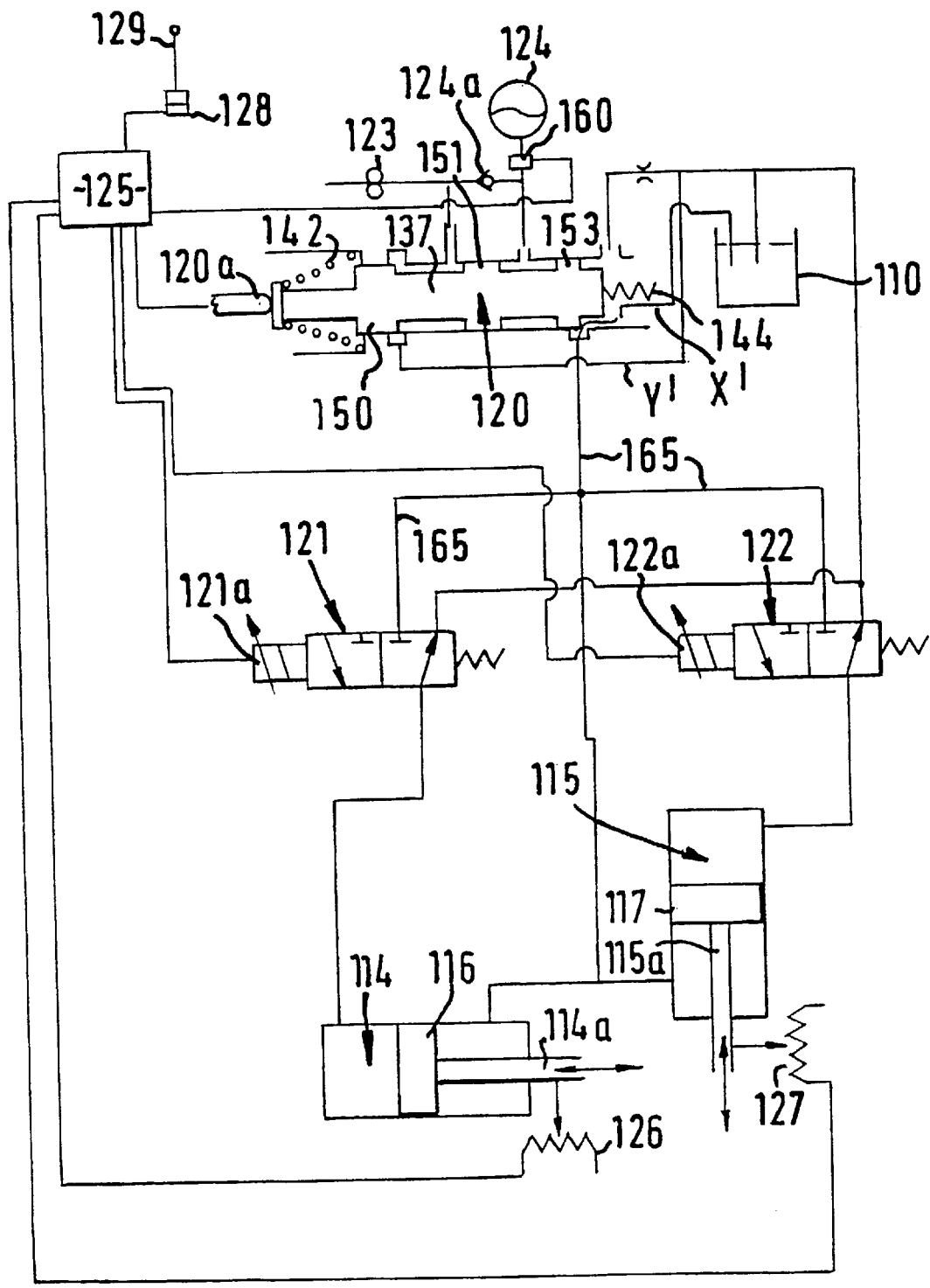
FIG. 2 shows diagrammatically details of a gear ratio selector system in accordance with the present invention.
Figure 3:
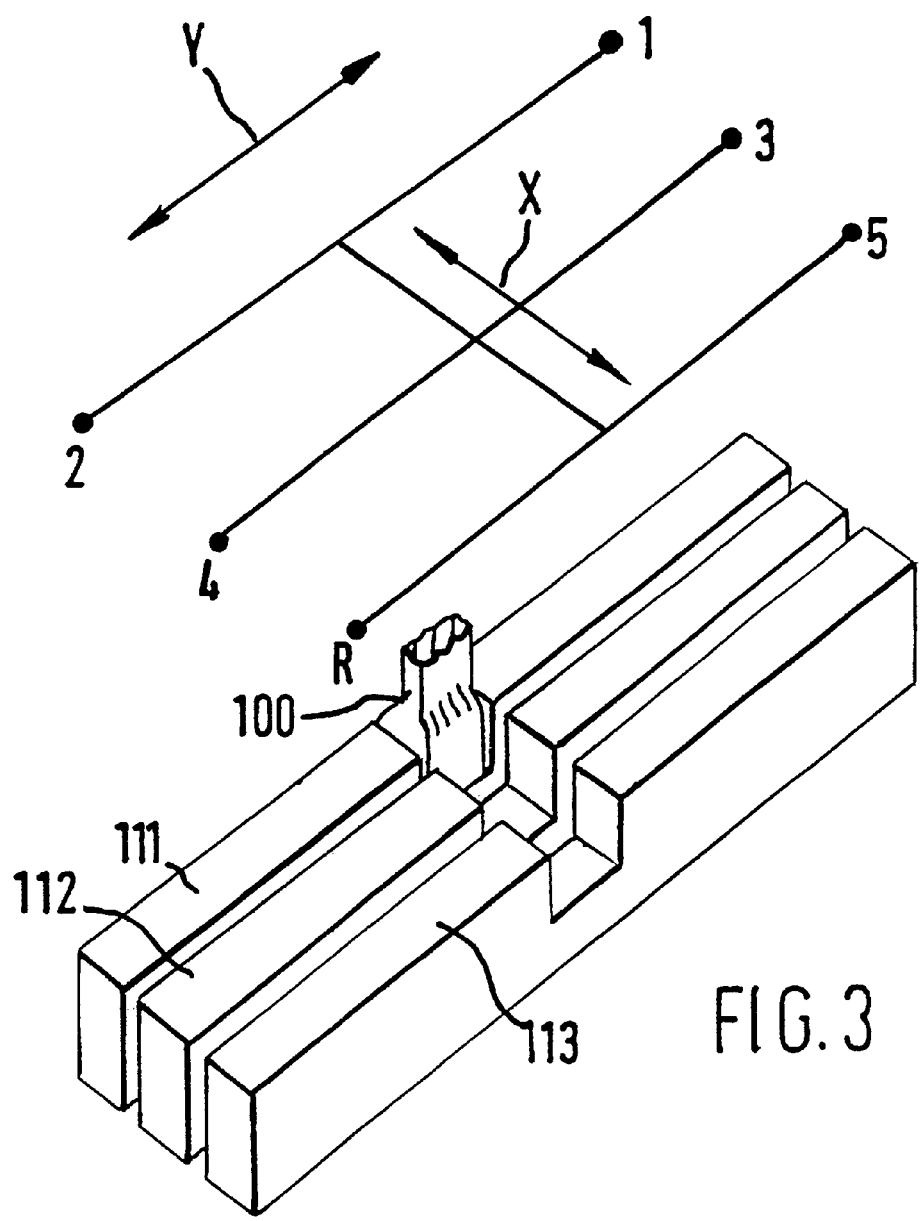
FIG. 3 shows the gear ratio selector gate used in the system of FIG. 2.

FIG. 2 illustrates diagrammatically the application of the invention to a ratio selector mechanism for an associated transmission in which a selector member 100 (see FIG. 3) is engageable with three shift rails 111, 112 and 113 which engage ratios in an associated vehicle transmission using the shift gale shown in FIG. 3. The shift rail 111 engages ratios 1 and 2, shift rail 112 engages ratios 3 and 4, and shift rail 113 engages ratio 5 and reverse.

The selector member 100 is movable in a first direction X by a first fluid pressure operated slave cylinder in the form of actuator 114 and in a second direction Y by a second fluid pressure operated slave cylinder in the form of actuator 115.

Thus by a combination of the movements of the first and second actuators 114 and 115 the selector member 110 can be moved in direction X for engagement with the required shift rail 111, 112 and 113 and moved in direction Y to move the currently engaged shift rail thus engaging the desired ratio.

The actuators 114 and 115 each comprise a double-acting ram with an operating rod 114a and 115a respectively which is operatively connected with the selector member 110 via a mechanism (not shown). As will be appreciated, the presence of the operating rods 114a and 115a results in piston 116 of actuator 114 having a rod side effective area which is less that the effective area of the other head side of the piston. Similarly piston 117 of actuator 115 has a smaller rod side area. Thus if both sides of the pistons are subjected to the same fluid pressure the pistons 116 and 117 will be displaced to extend the associated operating rods 114a and 115a.

The supply of pressure to the rod and head ends of the actuators 114 and 115 is controlled by three solenoid-operated valves 120, 121 and 122. Valve 120 is a master on/off valve which receives pressurised fluid from an electrically driven pump 123 and an associated accumulator 124 which is charged via a non-return valve 124a. Master valve 120, supplies fluid to proportional flow valves 121 and 122 and also directly to the rod-end of each actuator 114 and 115 via line 165.

Master valve 120 and proportional flow valves 121 and 122 are all controlled from an electric control unit 125 which not only issues electrical control signals to the solenoids 120a, 121a and 122a of the valves but receives signal inputs from potentiometers 126 and 127 which indicate the position of associated operating rods 114a and 115a, a signal from a sensor 128 associated with a ratio selector lever 129 which is moved within the ratio selection gate shown in FIG. 3 to select the desired ration of the associated transmission, and also signals from a pressure level sensor 160.

Master valve 120 is basically of the same form as valve 12 described above and similar components have therefore been designated with the same numerals increased by 100. Valve 120 has a landed spool 137 which is displaceable by solenoid 120a against the action of springs 142 and 144. Spool 137 again has a rest position, shown in FIG. 2, in which land 150 opens a dump line indicated diagrammatic at Y' to sump 110 so that the output of pump 123 is dumped to sump 110 and any pressure in the supply line 165 to valves 121 and 122 and to the rod ends of actuators 114 and 115 is vented to sump 110 via venting flow path indicated diagrammatically at X' around spool land 153.

Spool 137 is again displaceable by solenoid 12 to a first position to the right of the FIG. 2 position in which dump line Y' is closed-off by land 150 whilst venting flow path X' is still open. In this spool position accumulator 124 can be re-charged when the pressure signal from line pressure sensor 160 indicates to control unit 125 that this is necessary.

Spool 137 is again displaceable further to the right of the first position described above to a so-called "supply" position. When in this supply position land 152 cuts-off venting flow path X' and connects accumulator 124 with the line 165 to valves 121, 122 and the rod ends of actuators 114 and 115.

Thus, in response to the movement of selector lever 129 to select a desired ratio in the associated transmission, the sensor (or sensors) 128 outputs a signal to control unit 125 which is processed by control unit 125 and results in the emission of a signal to master valve 120 to move to the "supply" position in which pressurised fluid is supplied to valves 121 and 122 and also to the rod end of both actuators 114 and 115.

Dependent on the required movement of selector member 110, and the associated operating rods 114a and 115a, valves 121 and 122 are operated by the control unit 125 in the appropriate sequence to give the appropriate movement of operating rods 114a and 115a in the appropriate sequence.

Initially operating rod 114a is moved in direction X to engage the appropriate shift rail followed by movement of operating rod 115a to displace the shift rail currently engaged by the selector member 110 in direction 1 Y to engage the selected ratio.

Figure 4:
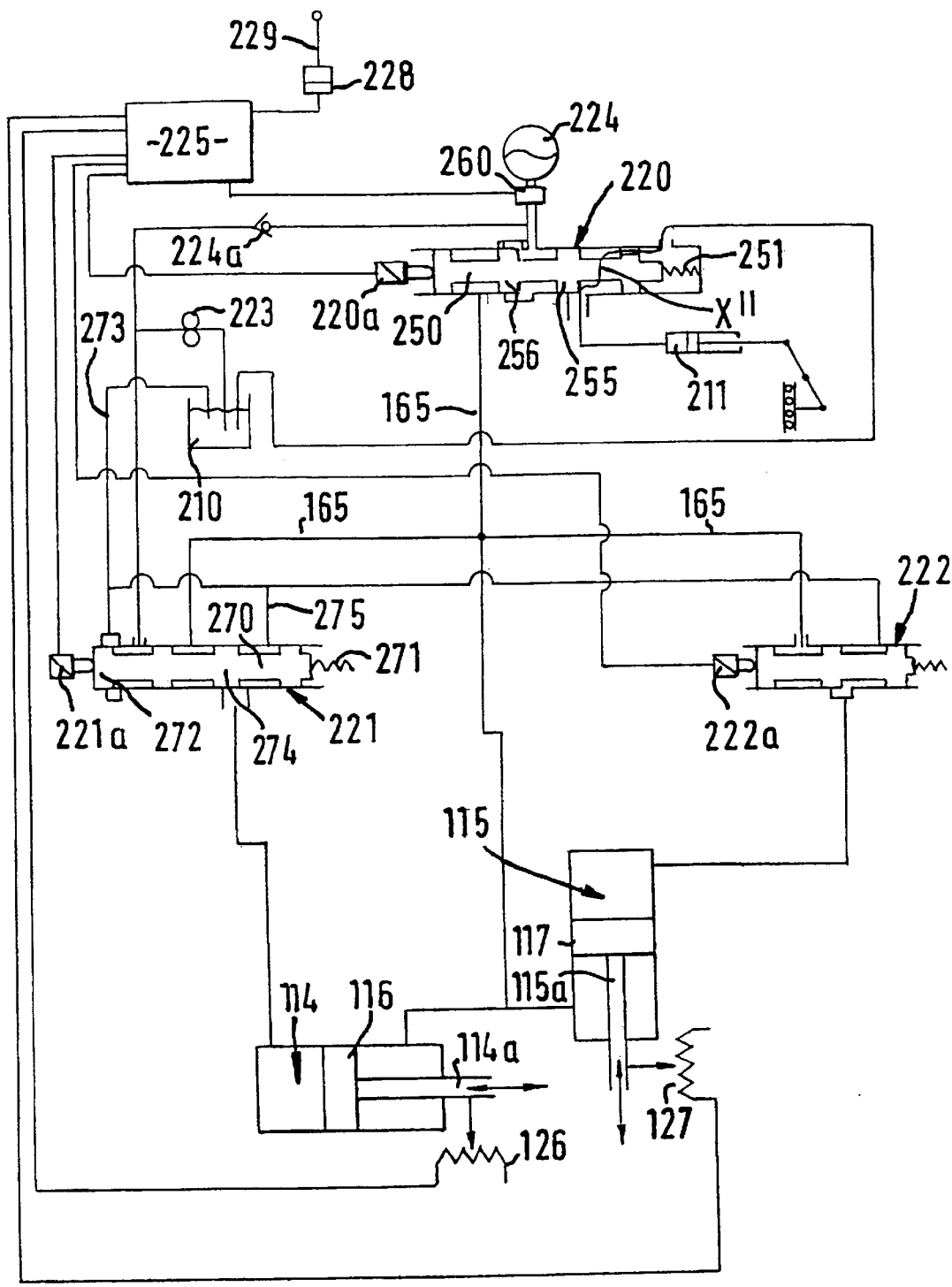
FIG. 4 shows diagrammatically details of a system in accordance with the present invention which actuates both a vehicle clutch and gear ratio selectors.

FIG. 4 shows the application of the invention to both the operation of a clutch slave cylinder and also the operation of ratio selector slave cylinders in an associated gear box. In FIG. 4 ratio selector actuators 114 and 115 are again provided as in FIG. 2. Pressurised fluid is supplied to the rod ends of actuators 114 and 115 via line 165 under the control of master valve 220 which receives pressurised fluid from an accumulator 224 which is charged by a one-way valve 224a from an electrically driven pump 223. Master valve 220 has a spool 250 which is displaced against a spring 251 by a solenoid 220a. When spool 250 is in the position shown in FIG. 4 clutch slave cylinder 211 is vented to sump 210 around land 255 via flow path X" and supply line 165 is isolated from the accumulator pressure by land 256.

Spool 250 can be displaced to the right from the position shown in FIG. 4 to a first position in which land 256 opens up the communication of accumulator pressure to line 165 to pressurise actuators 114 and 115. Spool 250 can also be displaced to a further position to the right of the above described first position in which land 255 closes off venting flow X" and pressure is supplied to line 165 and also to slave cylinder 211.

As previously described in relation to FIG. 2, solenoid 220a is under the control of an electronic control unit 225 which receives signals from ratio selector lever 229 and associated sensor 228.

The flow of fluid to and exhaust of fluid from the head end of actuator 115 is controlled by a valve 222 which is the same as valve 122 previously described in relation to FIG. 2 and which is operated by a solenoid 222a.

The flow of fluid to the head end of actuator 114 and the exhaust of fluid thereof controlled by valve 221 which has a landed spool 270 which is axially displaced by a solenoid 221a against the action of a spring 271. With spool 270 in the FIG. 4 position the output of pump 223 is returned to sump 210 around land 272 via line 273. If spool 270 is moved by solenoid 221a to a first position to the right of the position as shown in FIG. 4 spool 272 will cut off the dumping flow through line 273 and thus permit the output of pump 223 to be used to charge accumulator 224 when pressure level sensor 260 indicates that this necessary. When in this first position venting of the head end of actuator 114 still occurs around land 274 via lines 275 and 273.

Spool 270 can be displaced to a further position as the right of the first position described above using solenoid 221a. When in this further position the venting of the head end of actuator 114 via line 225 is cut-off by land 274 and pressurised fluid from line 165 passes to the head end of actuator 114 around the other side of land 274.

Thus valve 270 provides a dumping facility for the output of pump 223 when the spool 270 is in the de energised condition in a similar manner to valves 12 and 120 described above.

It will be evident from above that the system shown in FIG. 4 can operate both the slave cylinder 211 and the ratio selector actuators 114 and 115 by the sending of the appropriate signals from the control unit 225 to the solenoids 220a 221a and 222a. This combined operation of clutch slave 211 and actuator 114 and 115 is possible because whenever actuators 114 and 115 are required to be pressurised to effect a change in operative ratio of the associated gearbox it is also necessary to pressurise clutch slave 211 to maintain the clutch disengaged.

In addition to the advantages of low pump start-up torque associated with the dumping of pump output back to sump when accumulator 124 does not require charging, and the ability to turn-off the pump in this condition, the above described systems also allow flexibility in the grouping and siting of system components. For example, master valve 120 accumulator 124 and non-return valve 124a could be mounted with the valves 121 and 122 on or adjacent the gearbox and some distance away from pump 123 and its associated electric drive motor. This is possible because the line between the pump and the non-return valve is only pressurised when the accumulator is being charged.

In an alternative gear shifting arrangement, if required, actuators 114 and 115 can be located on the gearbox whilst valves 121, 122 and 120 can be located at a remote location (e.g. adjacent the pump/accumulator) since the lines to actuators 114 and 115 are only pressurised when actually effecting a change in ratio.

The system shown in FIG. 4 also offers similar flexibility in siting of components since its supply lines are only pressurised when actuators are actually in use of the accumulator is being re-charged.

In an alternative gear shifting arrangement, if required, actuator 114 and 115 can be located on the gearbox whilst valves 121, 122 and 120 can be located at a remote location since the lines to actuator 114 and 115 are only pressurised when actually effecting a change in ratio.

I claim:

1. An actuation system comprising a pump which charges an accumulator via a non-return valve, a solenoid-operated control valve which receives pressurised fluid from the accumulator, and a slave cylinder receives pressurised fluid from the accumulator via the control valve and which from which fluid can also be exhausted via the control valve, the control valve has a rest position in which pressurised fluid from the pump is returned to a sump and the slave cylinder is vented to the sump, a first energised position in which the return of pressurised fluid to the sump is cut-off and the slave cylinder remains vented to the sump, and a further energised position in which venting of the slave cylinder is cut-off and the slave cylinder is supplied with pressurised fluid from the accumulator.

2. A system according to claim 1 in which the pump is electrically driven and is stopped when the accumulator pressure is above a pre-determined level.

3. A system according to claim 1 in which the solenoid-operated control valve means is a spool valve with the flow of fluid to and from the slave cylinder controlled by the axial position of a spool with the initial axial movement of the spool from its rest position to a first energised position being arranged to cut-off the return flow of fluid from said pump to said sump and axial movement of the spool from said first energised position to said second energised position being arranged to cut-off said slave cylinder from said sump.

4. A system according to claim 3 in which the spool includes an axially extending passage down which fluid can flow from the slave cylinder to the sump.

5. A system according to claim 1 in which an electronic control means receives signals indicative of the operating condition of a component to be controlled by the slave cylinder, the electronic control means issuing signals to the solenoid-operated control valve means to supply fluid to or exhaust fluid from the slave cylinder in response to said operating condition signals.

6. A system according to any claim 1 in which the slave cylinder is connected with a vehicle clutch for the operation thereof.

7. A system according to claim 1 in which the solenoid-operated control valve means supplies fluid to more than one slave cylinder.

8. A system according to claim 7 in which the solenoid-operated control valve means supplies fluid to two slave cylinders which move gear selector members to select an operative gear ratio in an associated gearbox.

9. A system according to claim 8 in which the gear selector slave cylinders are double-acting rams, each ram having an actuating rod connected with an associated gear selector member, each ram being movable in one direction by pressurising the rod end of the ram and in the other direction by pressurising both ends of the ram.

10. A system according to claim 9 in which the rod end of each ram is supplied with pressurised fluid directly from the solenoid-operated control valve and the other end of each ram is supplied with pressurised fluid from the solenoid-operated control valve via a further solenoid-operated ratio selector valve which is also used to vent pressure from the other end of each ram.

11. A system according to claim 1 in which a solenoid-operated master valve supplies said pressurised fluid to and exhausts fluid from a clutch operating slave cylinder and also supplies said pressurised fluid directly to rod ends of two double acting gear selector rams which move gear selector members to select the operative ratio in an associated gearbox, the other end of one gear selector ram being supplied with said pressurised fluid and vented via the solenoid-operated control valve and the other end of these other gear selector ram being supplied with said pressurised fluid via a further solenoid-operated ratio selector valve which is also used to vent pressure from said other end of said other ram.

* * * * *